March 10, 1925.
J. KAPLAN
SUGAR CONTAINER
Filed July 6, 1922
1,528,927
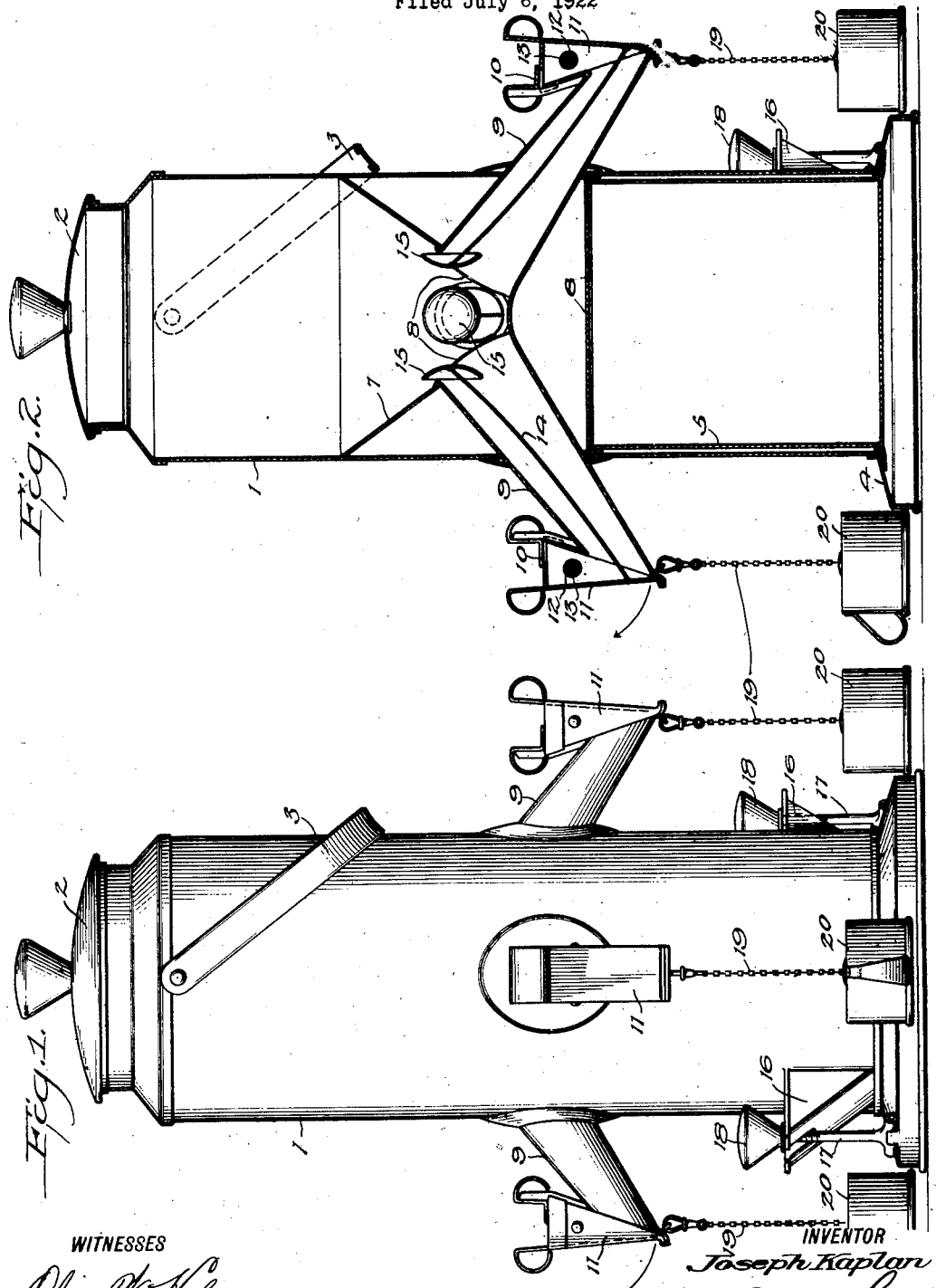
WITNESSES
INVENTOR
Joseph Kaplan
BY
ATTORNEYS Patented Mar. 10, 1925.

1,528,927

UNITED STATES PATENT OFFICE.

JOSEPH KAPLAN, OF BROOKLYN, NEW YORK.

SUGAR CONTAINER.

Application filed July 6, 1922. Serial No. 573,171.

*To all whom it may concern:*

Be it known that I, JOSEPH KAPLAN, a citizen of the United States, and a resident of the city of New York, Coney Island, borough of Brooklyn, in the county of Kings and State of New York, have invented a new and Improved Sugar Container, of which the following is a full, clear, and exact description.

This invention relates to a sugar container, and has for an object the provision of a simple, efficient, strong, durable container in which sugar can be stored so that the tendency to lump in a moist atmosphere will be as far as possible eliminated, and from which the sugar can be fed in desired quantities.

A further object resides in the provision of means whereby when it is desired to discharge sugar from the container the opening to one of the spouts will cause the sugar within the container to be agitated near the opening of the spout so that it will readily flow out.

A still further object resides in the provision of means whereby an extra quantity of sugar can be stored for use when the normal supply has been exhausted.

Another object resides in the provision of means to contain sugar which is particularly sanitary.

A still further object resides in the provision of means whereby a container when receiving a specified amount of sugar is connected.

Another object resides in the provision of means whereby the apparatus can be very easily taken apart for cleaning when desired.

A further object resides in the particular construction and arrangement of parts hereinafter described and claimed and shown in the accompanying drawings.

The invention is illustrated in the drawings, of which—

Figure 1 is a side elevation of the device; and

Figure 2 is a vertical diametrical section taken through the apparatus.

It is of course understood that the form of invention shown in the drawings is only one preferred form, which is illustrated for the purpose of showing an operative embodiment of the invention and that the various parts may be arranged in a slightly different manner and be formed of material other than those mentioned without departing from the spirit of the invention.

The invention includes a cylindrical body portion 1 open at the bottom and provided with a removable cover 2 and a handle 3. This body portion is adapted to rest on a base portion 4 from which an auxiliary cylindrical container 5 rises. This body portion is separated interiorly from the container 5 by having a false bottom 6 disposed therein just above the top of the auxiliary container. Also the body portion is provided substantially midway of its length with a funnel shaped portion 7 provided with a plurality of discharge apertures 8 with which discharge funnels 9 are connected. These funnels 9 pass through the walls of the body portion near its lower edge and have on their lower ends head portions 10 on which pivoted closure portions 11 are mounted. These closure portions are adapted to be held closed by springs 12 surrounding the shafts 13 on which closures are pivotally mounted. To each of the closure portions a connection, such as a wire 14 is fastened, the other end of the wire or connection 14 being fastened to a curved plate 15 acting as a sort of stirrer so that when the closure is moved the stirrer will be moved to loosen and agitate the sugar near the bottom of the funnel 7, whereby it may be permitted readily to flow down the spout 9.

Along the outside of the body portion at the bottom thereof I provide slotted brackets 16. Attached to the base 4 are a plurality of pivoted links 17, the upper ends of which are threaded to receive nuts 18. These links are adapted to extend through the slots in the brackets 16 and the nuts 18 by being threaded down on the links will hold the body portion onto the base portion in the manner shown.

Attached to the lower end of each spout 9 is a connection, such as a chain 19, on which a suitable receptacle such as a cup 20 is supported. These cups may, if desired, be of the required cubical contents to receive a measured amount of sugar. They may of course have graduations on their surfaces to indicate other amounts if desired, although this graduation is not shown.

I claim:

A sugar receptacle, which includes a base portion, an auxiliary sugar container disposed thereon and having an open upper end to receive an auxiliary supply of sugar, a main receptacle having an open bottom disposed on said base, the lower portion of the main receptacle surrounding the auxiliary receptacle, a tapered bottom wall within the main receptacle above the open end of the auxiliary receptacle, and a discharge spout extending from the main receptacle.

JOSEPH KAPLAN.